US012767107B2

(12) United States Patent
Boo et al.

(10) Patent No.: US 12,767,107 B2
(45) Date of Patent: Oct. 20, 2026

(54) BRAKE DEVICE AND VEHICLE EQUIPPED WITH BRAKE DEVICE

(71) Applicant: HYUNDAI MOBIS CO., LTD., Seoul (KR)

(72) Inventors: Sang Pil Boo, Yongin-si (KR); Choong Sik Shin, Suwon-si (KR); Mun Hwan Byoun, Seoul (KR); Keun Mo Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 385 days.

(21) Appl. No.: 18/531,863

(22) Filed: Dec. 7, 2023

(65) Prior Publication Data

US 2025/0074377 A1 Mar. 6, 2025

(30) Foreign Application Priority Data

Aug. 30, 2023 (KR) ........................ 10-2023-0114891

(51) Int. Cl.
*B60T 11/236* (2006.01)
*B60T 11/18* (2006.01)
*B60T 1/06* (2006.01)
*B60T 11/10* (2006.01)

(52) U.S. Cl.
CPC ............. *B60T 11/236* (2013.01); *B60T 11/18* (2013.01); *B60T 1/065* (2013.01); *B60T 11/102* (2013.01)

(58) Field of Classification Search
None
See application file for complete search history.

(56) References Cited

U.S. PATENT DOCUMENTS

2023/0103320 A1* 4/2023 Yabusaki .............. B60T 13/745 188/72.4

FOREIGN PATENT DOCUMENTS

| | | | | |
|---|---|---|---|---|
| FR | 3132552 A1 * | 8/2023 | ............. | F16D 65/18 |
| JP | 2961910 B2 * | 10/1999 | | |
| JP | 3893679 B2 * | 3/2007 | ............ | B60T 13/686 |
| KR | 20060068124 A * | 6/2006 | ........... | F16D 65/847 |

OTHER PUBLICATIONS

FR-3132552-A1: English Machine Translation (Year: 2023).*
JP-3893679-B2: English Machine Translation (Year: 2007).*
KR-20060068124-A: English Machine Translation (Year: 2006).*
JP-2961910-B2: English Machine Translation (Year: 1999).*

* cited by examiner

*Primary Examiner* — Melanie Torres Williams
(74) *Attorney, Agent, or Firm* — NovoTechIP International PLLC

(57) ABSTRACT

A brake device that pressurizes a brake pad as brake fluid in a master cylinder operates a caliper piston by a master piston that operates by receiving power of a driving motor of a brake module kit in the present disclosure applies a brake module kit to various types of caliper bodies and commonizes the brake module kit.

12 Claims, 9 Drawing Sheets

PRIOR ART

PRIOR ART (a)

BRAKE DEVICE AND VEHICLE EQUIPPED WITH BRAKE DEVICE

CROSS-REFERENCE TO RELATED APPLICATIONS

This application claims the benefit of Korean Patent Application No. 10-2023-0114891, filed on Aug. 30, 2023, which is hereby incorporated by reference as if fully set forth herein.

TECHNICAL FIELD

The present disclosure relates to a brake device connected to a brake disk of a vehicle and the vehicle equipped with the brake device.

BACKGROUND

A brake device mounted on a vehicle is a device for decelerating or stopping the traveling vehicle or maintaining the stopped state of the vehicle, and is a device located inwardly of a rotating wheel and applying a great pressure to a disk-shaped brake disk rotating together with the wheel from both sides using brake pads to brake the vehicle.

In the conventional brake device, the two brake pads disposed on both sides of the disk are supported in a state capable of moving forward and backward on a seating surface inside a caliper body fixed to the vehicle. A pad support pin for guiding the forward and backward movement of the brake pad and a spring member for elastically supporting upper portions of two pad plates to prevent vibration of the pad plate and to ensure a smooth return operation are installed.

The brake device that presses the brake pad in a direction of the brake disk is largely divided into a hydraulic brake scheme and an electromechanical brake (EMB) scheme. The hydraulic type is a traditional brake scheme. When a driver steps on a brake, a force that the driver steps on the brake is immediately transmitted to brake fluid sealed in a master cylinder via a piston of the master cylinder.

This force generates a pressure in the brake fluid in the master cylinder. Based on the Pascal's principle, this pressure is transmitted via a brake pipe to each wheel cylinder and back to a caliper piston. The pressure transmitted to the caliper piston is converted into a compressing force that acts on the brake pad.

When the force is transmitted using the liquid, it is easy to amplify the force. Because the hydraulic brake is operated at a high pressure, a great force may be obtained even when a size of a component of the brake device, for example, a diameter of the wheel cylinder is small.

Unlike the conventional hydraulic brake system, the electromechanical brake (EMB) is a system that converts the force that the driver steps on the brake pedal into an electrical signal and transmits the electrical signal to an electronic control unit (ECU), and the electronic control unit calculates a vehicle state and a braking force and operates a motor to generate a braking force of an electric caliper.

When the electromechanical brake is applied, the vehicle does not need many of parts of a conventional hydraulic line, such as the master cylinder and a booster, so that the number of braking-related parts is greatly reduced. This simplifies a structure of the brake system, greatly increasing flexibility in vehicle design.

Mounting of the brake system in the vehicle also becomes freer. The driver may install the brake pedal at the most convenient place without having to fix the same at a current position thereof. In a case of further development, the brake pedal may be mounted in a form of a button on a steering wheel.

FIGS. 1 and 2 show a conventional electromechanical brake. A motor 20 is driven by receiving an electrical signal as shown in FIG. 1, and a force of the motor is transmitted to a bolt screw 60 that drives a piston 50 for pressing a brake pad 40 seated in a caliper body 10 in FIG. 2.

As shown in FIGS. 1 and 2, the electromechanical brake may include the bolt screw 60 for converting a rotational force of the motor 20 into a linear force, and include a reduction gear 30 composed of a plurality of gears for transmitting the power of the motor 20 the bolt screw 60 and for reducing a speed of the motor when the motor 20 is placed on one side due to constraints of a space located inwardly of the wheels.

As shown in FIGS. 1 and 2, the electromechanical brake may be constructed in a shape of pressing only a brake pad 40 on one side with one piston 50. This is because of a size of the bolt screw 60, and because the reduction gear 30 cannot be disposed so as to be exposed in a lateral direction of the vehicle.

In addition, in the case of hydraulic type, the pressures may be transmitted simultaneously to operate the pair of brake pads without errors, but in case of electromechanical type, operation deviation may occur because of the speed of the motor and because the force is transmitted via the plurality of gears. There is also a problem in that a cost increases because four bolt screws, two or more motors, the reduction gear disposed between each bolt screw and the motor, and the like are required.

However, it is difficult to apply the electromechanical brake to heavy vehicles or large passenger vehicles and high-performance vehicles because opposing brakes are required for stable braking and performance.

SUMMARY

The present disclosure is to provide a brake device and a vehicle equipped with the brake device, and more specifically, to provide a brake device that may apply a brake module kit to various types of caliper bodies and commonize the same, and a vehicle equipped with the brake device.

In addition, the present disclosure is to provide a brake device in which even when the number of caliper pistons that pressurize a brake pad is increased, there is no need to increase the numbers of motors, gears, and bolt screws, and an operational deviation between the caliper pistons does not occur, and a vehicle equipped with the brake device.

In addition, the present disclosure is to provide a brake device in which a size of a component may be reduced compared to a conventional electromechanical brake, enabling a lightweight and compact design, thereby securing additional space for mounting other components such as an electronic control unit, and a vehicle equipped with the brake device.

Problems to be solved in the present disclosure are not limited to the problems mentioned above, and other problems not mentioned will be clearly understood by those skilled in the art in the technical field to which the present disclosure belongs from the description below.

Provided is a brake device including a caliper body, a brake pad located inside the caliper body, a caliper piston that pressurizes one surface of the brake pad, a caliper cylinder receiving the caliper piston received thereinto, and a brake module kit connected to the caliper cylinder, wherein the brake module kit includes a master cylinder where brake fluid flows, a master piston that moves linearly in the master cylinder, and a driving motor that moves the master piston, wherein in response to that the driving motor operates, the master piston pressurizes the brake fluid to allow the brake fluid to flow to the caliper cylinder, and the caliper piston presses the brake pad by the pressure of the brake fluid that has flowed to the caliper cylinder.

The brake module kit may include a bolt screw that converts a rotational force of the driving motor into a linear motion and transmits the linear motion to the master piston, an elastic member that returns the master piston to a location before the driving motor operates, and a reducer located between the driving motor and the bolt screw, and the reducer may include one of a guide belt and a guide gear that connect and synchronize the driving motor and the bolt screw with each other.

The brake module kit may include a reservoir connected to a first connection portion located on a side surface of the master cylinder and storing the brake fluid therein.

The reservoir may further include a coolant chamber storing coolant therein, and the brake module kit may include a coolant pipe connected to the coolant chamber and surrounding the driving motor.

The master cylinder may include a second connection portion located on the side surface thereof and connected to the caliper cylinder, and the brake module kit may include a first seal cup located around the master piston and filling a gap between the master piston and the master cylinder.

The first seal cup may open a space between the second connection portion and the first connection portion before the master piston operates, and separate the second connection portion and the first connection portion from each other and allow the brake fluid to be pressurized in a direction of the second connection portion in response to that the master piston operates.

The brake module kit may include a second seal cup spaced apart from the first seal cup, located around the master piston, blocking the brake fluid from leaking to one side of the master piston.

The caliper cylinder and the caliper piston may include a plurality caliper cylinders and a plurality of caliper pistons, respectively, and the master cylinder may be connected to the plurality of caliper cylinders.

The brake module kit may include an electronic control unit (ECU).

Provided is a vehicle including a vehicle body, a plurality of wheels that are located beneath the vehicle body, rotate, and respectively include brake discs, and a plurality of brake devices disposed on the plurality of wheels and in contact with the brake discs to limit the rotation of the plurality of wheels, respectively, wherein at least one of the plurality of brake devices includes a caliper body, a brake pad located inside the caliper body, a caliper piston that pressurizes one surface of the brake pad, a caliper cylinder receiving the caliper piston received thereinto, and a brake module kit connected to the caliper cylinder, wherein the brake module kit includes a master cylinder where brake fluid flows, a master piston that moves linearly in the master cylinder, and a driving motor that moves the master piston, wherein in response to that the driving motor operates, the master piston pressurizes the brake fluid to allow the brake fluid to flow to the caliper cylinder, and the caliper piston presses the brake pad by the pressure of the brake fluid that has flowed to the caliper cylinder.

The brake device and the vehicle equipped with the brake device according to the present disclosure may apply the brake module kit to the various types of caliper bodies and commonize the same.

In addition, even when the number of caliper pistons that pressurize the brake pad is increased, there is no need to increase the numbers of motors, gears, and bolt screws, and the operational deviation between the caliper pistons may not occur.

In addition, the size of the component may be reduced compared to the conventional electromechanical brake, enabling the lightweight and compact design, thereby securing the additional space for mounting other components such as the electronic control unit.

Effects obtainable from the present disclosure are not limited to the effects mentioned above, and other effects not mentioned will be clearly understood by those skilled in the art in the technical field to which the present disclosure belongs from the description below.

DETAILED DESCRIPTION

Description will now be given in detail according to exemplary embodiments disclosed herein, with reference to the accompanying drawings. The same or equivalent components may be provided with the same reference numbers, and description thereof will not be repeated. As used herein, the suffixes "module" and "part" are added or used interchangeably to facilitate preparation of this specification and are not intended to suggest distinct meanings or functions. In describing embodiments disclosed in this specification, relevant well-known technologies may not be described in detail in order not to obscure the subject matter of the embodiments disclosed in this specification. In addition, it should be noted that the accompanying drawings are only for easy understanding of the embodiments disclosed in the present specification, and should not be construed as limiting the technical spirit disclosed in the present specification. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, it will be understood that when an element is referred to as being "directly connected with" another element, there are no intervening elements present.

A singular representation may include a plural representation unless it represents a definitely different meaning from the context.

The terms such as "include" or "have" used herein are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Figure 3:
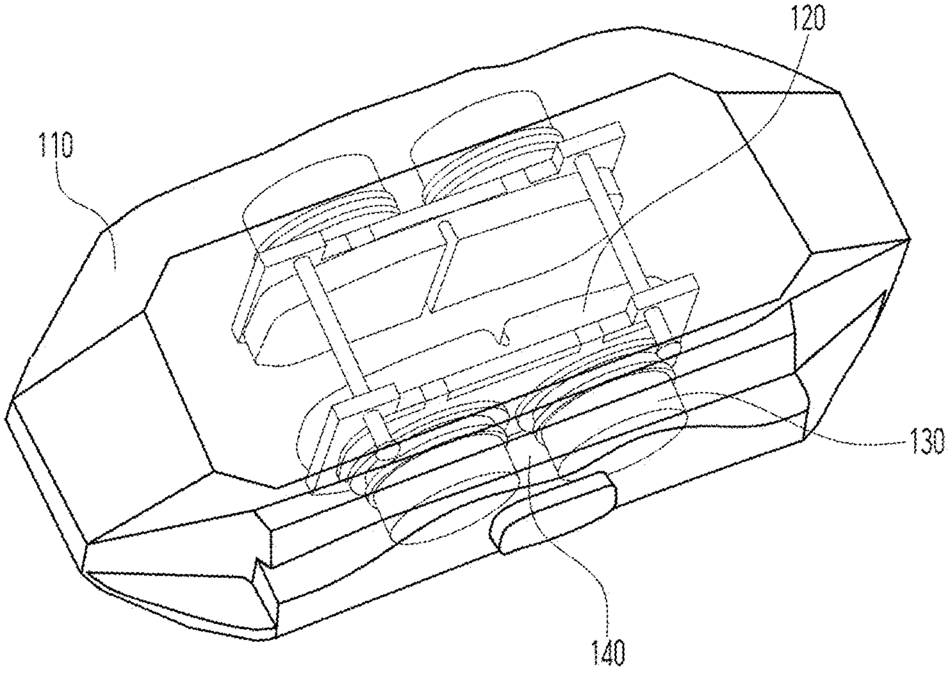
FIG. 3 is a perspective view showing a caliper body according to one of embodiments of the present disclosure.
Figure 4:
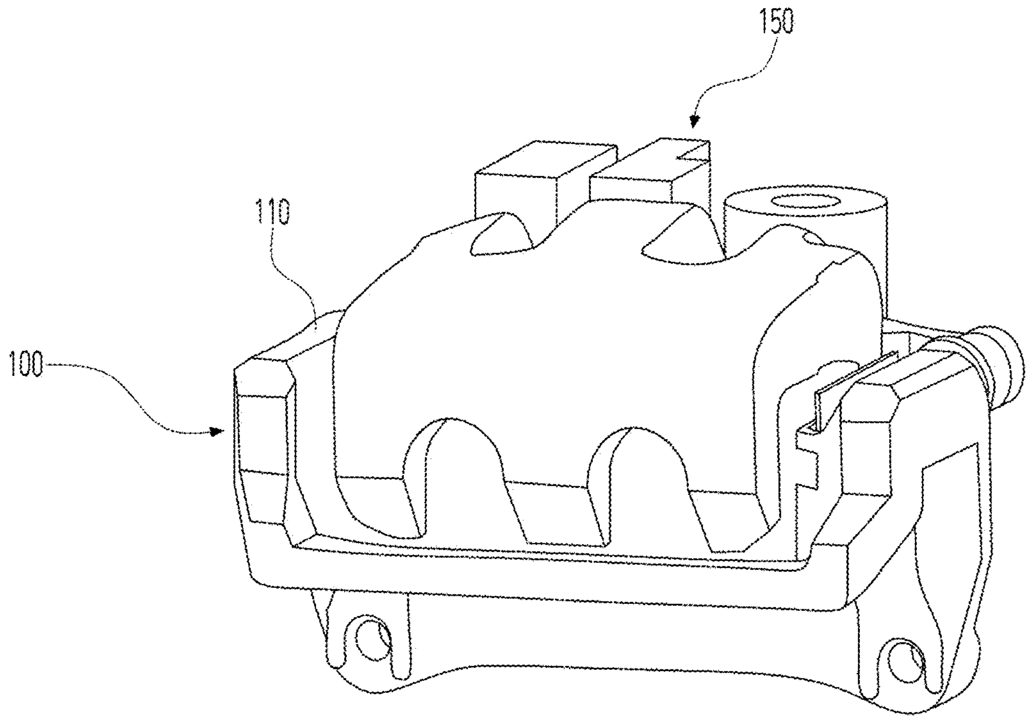
FIG. 4 is a perspective view of a brake device according to one of embodiments of the present disclosure.
Figure 5:
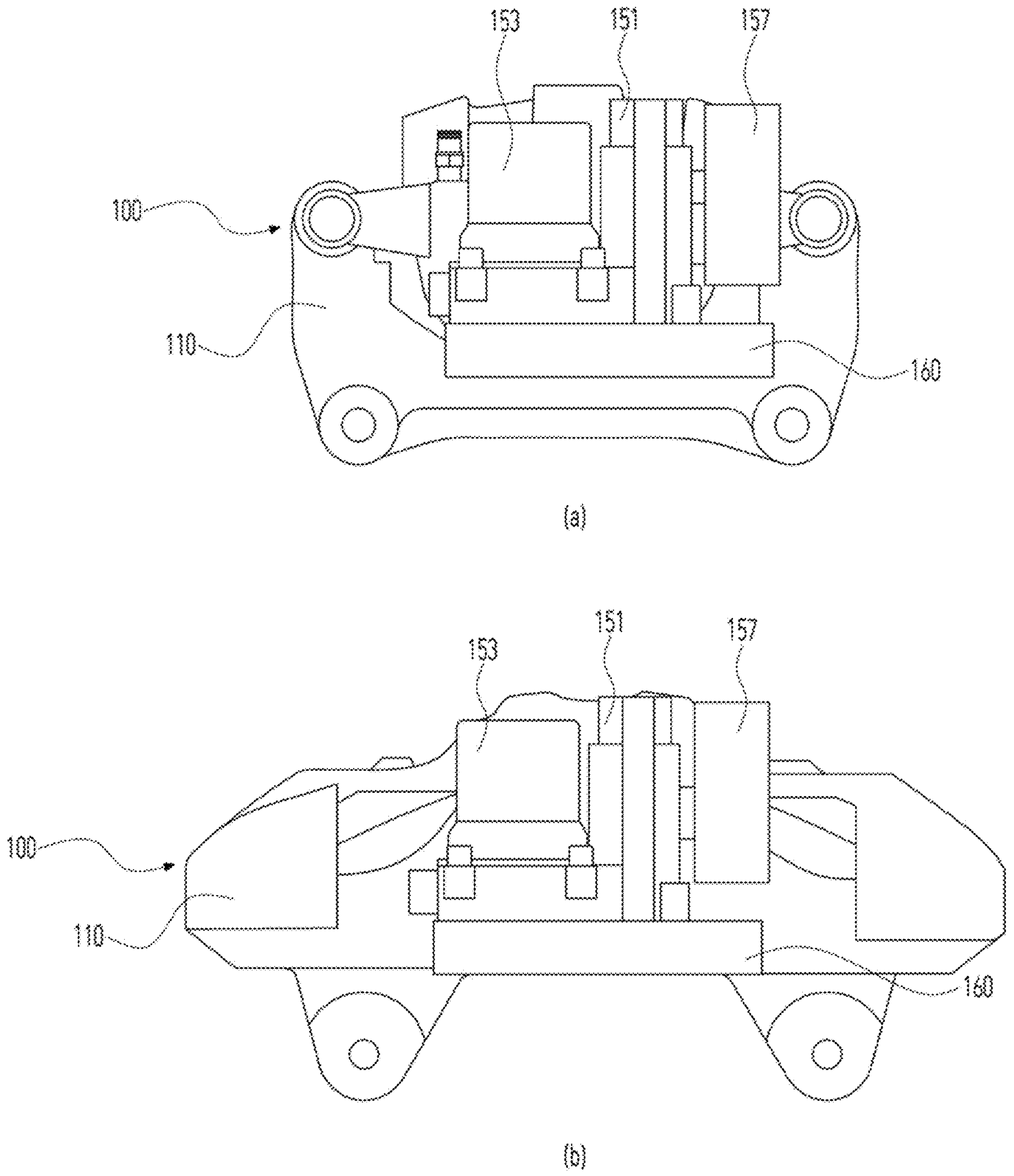
FIG. 5 is a diagram showing various embodiments of a brake device of the present disclosure.
Figure 6:
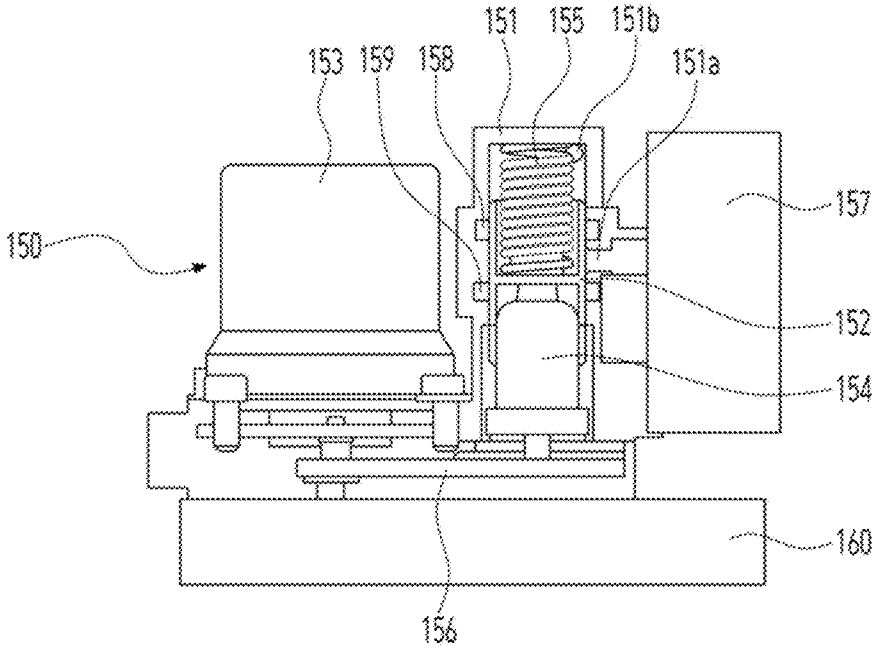
FIG. 6 is a cross-sectional view showing a brake module kit in a brake device according to one of embodiments of the present disclosure.

FIG. 3 is a perspective view showing a caliper body 110 according to one of embodiments of the present disclosure. FIG. 4 is a perspective view of a brake device 100 according to one of embodiments of the present disclosure. FIG. 5 is a diagram showing various embodiments of the brake device 100 of the present disclosure. In addition, FIG. 6 is a cross-sectional view showing a brake module kit 150 in the brake device 100 according to one of embodiments of the present disclosure.

The brake device 100 according to one embodiment of the present disclosure may include the caliper body 110, a brake pad 120, a caliper piston 130, a caliper cylinder 140, and the brake module kit 150 connected to the caliper cylinder 140.

The brake pad 120 may be located inside (or disposed within) the caliper body 110, and as shown in FIG. 3, may include a pair of brake pads located opposing each other. In addition, a brake disc of a vehicle may be located (or disposed) between the pair of brake pads 120. The caliper body 110 shown in FIG. 3 has an opposing structure and has excellent braking performance, so that the caliper body 110 is applicable to a heavy vehicle or a high-specification vehicle. The brake device 100 in the present disclosure may apply the brake module kit 150 even to the caliper body 110 with the opposing structure, and more specific details thereof will be described later.

The caliper piston 130 may pressurize one surface of the brake pad 120, and the caliper piston 130 may be inserted into the caliper cylinder 140. In addition, the caliper cylinder 140 and the caliper piston 130 may respectively include a plurality of caliper cylinders and a plurality of caliper pistons. The brake device 100 according to one embodiment of the present disclosure may connect the single brake module kit 150 to the plurality of caliper cylinders 140 to reduce operational deviations of the plurality of caliper pistons 130. More specific details thereof will be described later.

The brake module kit 150 may be connected to the caliper cylinder 140 and may be located on a side surface of the caliper body 110 as shown in FIGS. 4 and 5. FIG. 4 and (a) in FIG. 5 are diagrams showing an embodiment in which the brake module kit 150 is applied to the caliper body 110 having the two caliper pistons 130, and (b) in FIG. 5 is a diagram showing an embodiment in which the brake module kit 150 is applied to the caliper body 110 with the opposing structure described above with reference to FIG. 3.

In this regard, a shape of the caliper body 110 shown in FIGS. 3 to 5 is only a shape for illustrating the embodiment of the brake device 100 in the present disclosure, and the brake device 100 in the present disclosure is to apply the brake module kit 150 to the caliper body 110 in various shapes, so that the shape of the caliper body 110 is not limited to that shown in FIGS. 3 to 5.

Referring to FIG. 6 together, in the brake device 100 according to one embodiment of the present disclosure, the brake module kit 150 may include a master cylinder 151, a master piston 152, and a driving motor 153. In addition, the brake module kit 150 may further include a bolt screw 154, an elastic member 155, a reducer 156, a reservoir 157, a first seal cup 158, a second seal cup 159, and an electronic control unit 160.

In this regard, the brake module kit 150 may be located on an inner side of a wheel so as not to be exposed to the outside of the vehicle. Additionally, in the brake device 100 according to one embodiment of the present disclosure, the caliper body 110 may have a separate storage space for accommodating the brake module kit 150 therein. Because parts such as the master cylinder 151, the master piston 152, and the driving motor 153 may be contaminated when exposed to the outside, the storage space may be defined in the caliper body 110 to minimize the number of parts exposed to the outside.

FIG. 6 is a cross-sectional view showing the brake module kit 150 in the brake device 100 according to one of embodiments of the present disclosure.

The driving motor 153 may operate in response to an electrical signal including a driving command applied from the electronic control unit 160. The driving motor 153 may provide a rotational force, and the brake module kit 150 may include the bolt screw 154 to convert the rotational force of the driving motor 153 into a linear motion.

The bolt screw 154 may include a bar-shaped screw with a spiral and a bolt engaged with the screw, and the bolt may be coupled onto a rail where only the linear motion is possible without rotating. When the screw rotates, the bolt is not able to rotate, so that the bolt moves in a straight line along the spiral of the screw. Therefore, a length of the bolt screw 154 may vary by the operation of the driving motor 153.

Because the bolt screw 154 includes the spiral screw, a certain length is required. The bolt screw 154 may pressurize the master piston 152 while moving.

Figure 1:
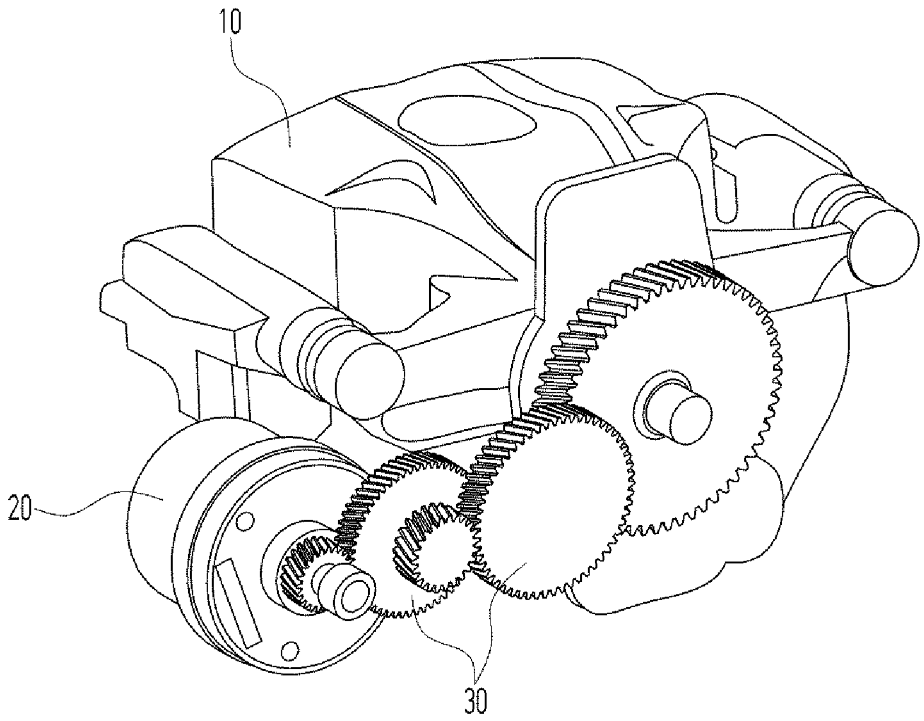
FIG. 1 is a perspective view showing a conventional electromechanical brake.
Figure 2:
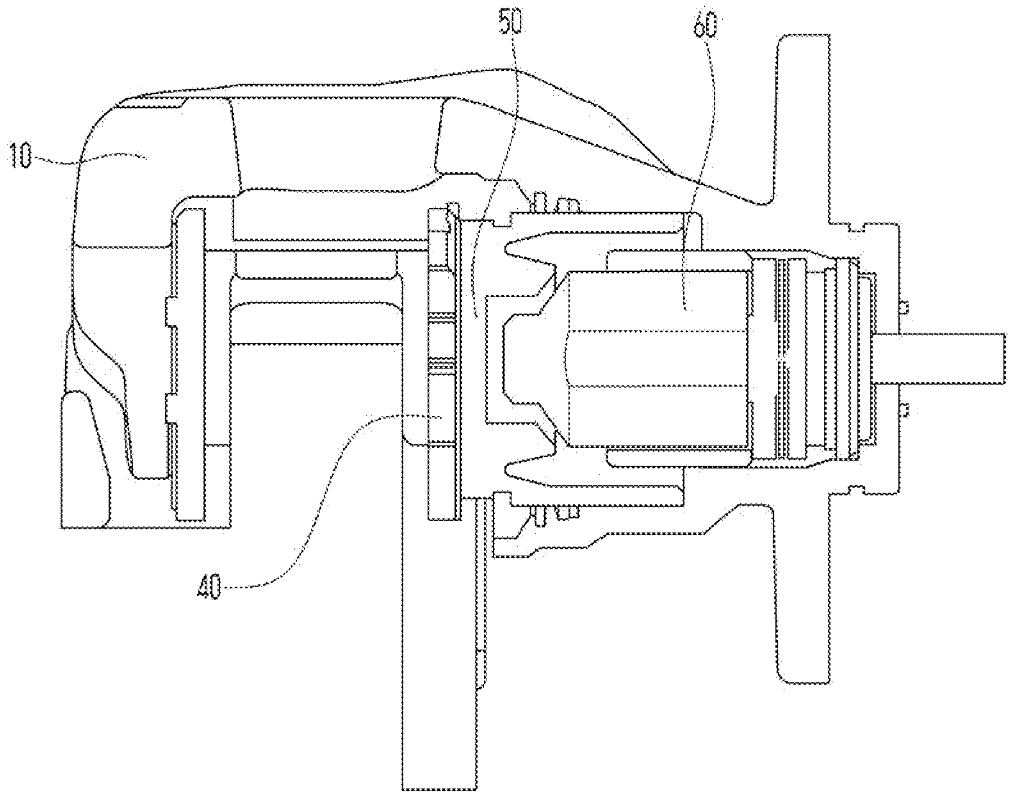
FIG. 2 is a cross-sectional view showing a conventional electromechanical brake.

Referring to FIGS. 1 and 2 together, in the conventional electromechanical brake, the bolt screw 60 pressurizes the piston 50 that directly pressurizes the brake pad 40, but in the present disclosure, a pressure caused by the linear motion of the bolt screw 154 is transmitted to the caliper piston 130 using the master piston 152 and the master cylinder 151.

The master cylinder 151 is a cylindrical member with brake fluid injected thereinto. The cylindrical master piston 152 may be inserted into one side of the master cylinder 151. In addition, the master cylinder 151 may include a first connection portion 151*a* on a side surface thereof. Additionally, the brake module kit 150 may include the reservoir 157 connected to the first connection portion 151*a* and storing the brake fluid therein.

Additionally, the master cylinder 151 may include a second connection portion 151*b* connected to the caliper cylinder 140 into which the caliper piston 130 is inserted, on the side surface thereof. Accordingly, the brake fluid in the master cylinder 151 may flow to the caliper cylinder 140 via the second connection portion 151_b_ and pressurize the caliper piston 130.

Additionally, in the brake device 100 according to one embodiment of the present disclosure, the brake module kit 150 may include the first seal cup 158 and the second seal cup 159 located around the master piston 152.

The first seal cup 158 may serve to fill a gap between the master cylinder 151 and the master piston 152 such that the brake fluid flows to the caliper cylinder 140 via the second connection portion 151_b_ in response to that the master piston 152 is pressurized.

In addition, the first connection portion 151_a_ connected to the reservoir 157 that stores the brake fluid may be located adjacent to the first seal cup 158.

Before the master piston 152 is pressurized, a space between the second connection portion 151_b_ and the first connection portion 151_a_ is opened, so that the master cylinder 151 is filled with the brake fluid.

When the master piston 152 is pressurized, the first seal cup 158 may shield the space between the second connection portion 151_b_ and the first connection portion 151_a_, and the pressure of the master piston 152 may be transmitted toward the second connection portion 151_b_ without being distributed toward the reservoir 157.

In addition, the second seal cup 159, located on one side of the master cylinder 151, that is, on a side where the master piston 152 is inserted, may serve to the shield brake fluid from leaking to the side where the master piston 152 is inserted.

The first seal cup 158 and the second seal cup 159 may protrude from an outer circumferential surface of the master piston 152 and may be in close contact with an inner surface of the master cylinder 151. In this regard, airtightness may be maintained using an elastic material such as urethane or silicone.

In addition, in the brake device 100 according to one embodiment of the present disclosure, the brake module kit 150 may further include the clastic member 155 located at an end of the master piston 152 such that the master piston 152 returns to an original location thereof again in response to that the force pressurizing the master piston 152 disappears as the driver releases the brake pedal and the driving motor 153 stops operating.

In addition, in the brake device 100 according to one embodiment of the present disclosure, the brake module kit 150 may further include the electronic control unit 160. More specifically, as shown in FIG. 5, because there is ample space beneath the master cylinder 151, the electronic control unit 160 may be disposed beneath the master cylinder 151.

In addition, the electronic control unit 160 may control the operation of the driving motor 153 as described above, and may additionally play a role in controlling various sensors such as a pressure sensor that is disposed inside the master cylinder 151 to detect the pressure of the brake fluid.

Referring to FIGS. 4 to 6 together, in the brake device 100 according to one embodiment of the present disclosure, when a driving signal via the electronic control unit 160 is applied to the driving motor 153, the driving motor 153 may rotate the bolt screw 154 while rotating, and the bolt screw 154 may pressurize the master piston 152 to allow the brake fluid in the master cylinder 151 to flow to the caliper cylinder 140, causing the caliper piston 130 to protrude.

The caliper piston 130 may perform braking by pushing the brake pad 120 such that the brake pad 120 comes into contact with the brake disc. In this regard, the brake fluid supplied from the master cylinder 151 may be evenly distributed to the plurality of caliper cylinders 140, so that the plurality of caliper pistons 130 may pressurize the brake pad 120 with uniform force. Therefore, the brake device 100 in the present disclosure is able to perform the stable braking.

Additionally, the brake device 100 according to one embodiment of the present disclosure may include the plurality of caliper cylinders 140 and the plurality of caliper pistons 130 as described above. In this regard, in the case of the conventional electromechanical brake, as described above, the plurality of pistons are respectively operated via the plurality of driving parts, so that an operational deviation between the plurality of pistons may occur.

However, the brake device 100 in the present disclosure may connect the master cylinder 151 of the brake module kit 150 with the plurality of caliper cylinders 140 via the second connection portion 151_b_, and the plurality of caliper pistons 130 may pressurize the brake pad 120 by the pressure of the brake fluid that has flowed to the plurality of caliper cylinders 140 via the operating of the driving motor 153.

In other words, in the brake device 100 in the present disclosure, the brake fluid supplied from the master cylinder 151 may be uniformly distributed to the plurality of caliper cylinders 140 via the single brake module kit 150, and the plurality of caliper pistons 130 may pressurize the brake pad 120 with the uniform force, so that the operational deviation between the plurality of caliper pistons 130 may not occur. Accordingly, the stable braking may be performed.

Figure 7:
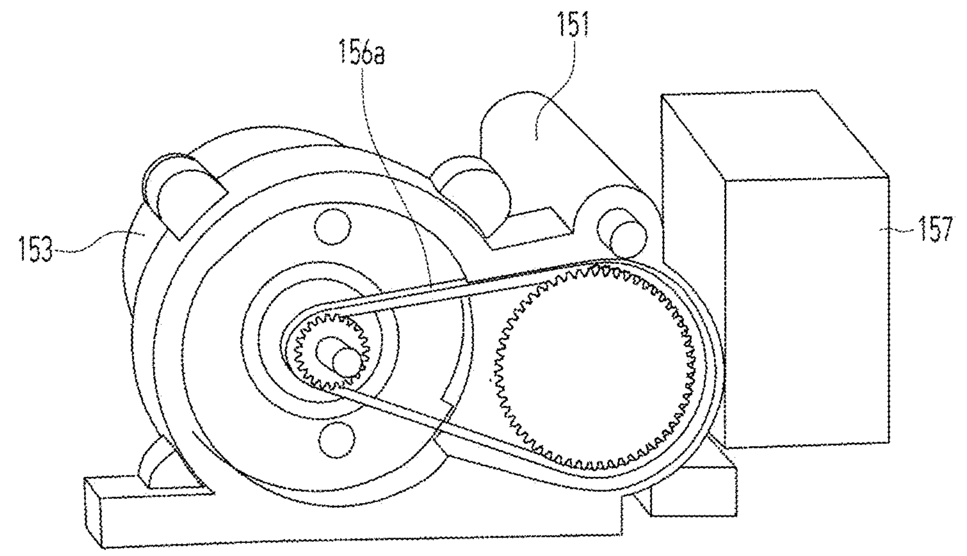
FIG. 7 is a diagram showing a reducer of a brake module kit in a brake device according to one of embodiments of the present disclosure.
Figure 7:
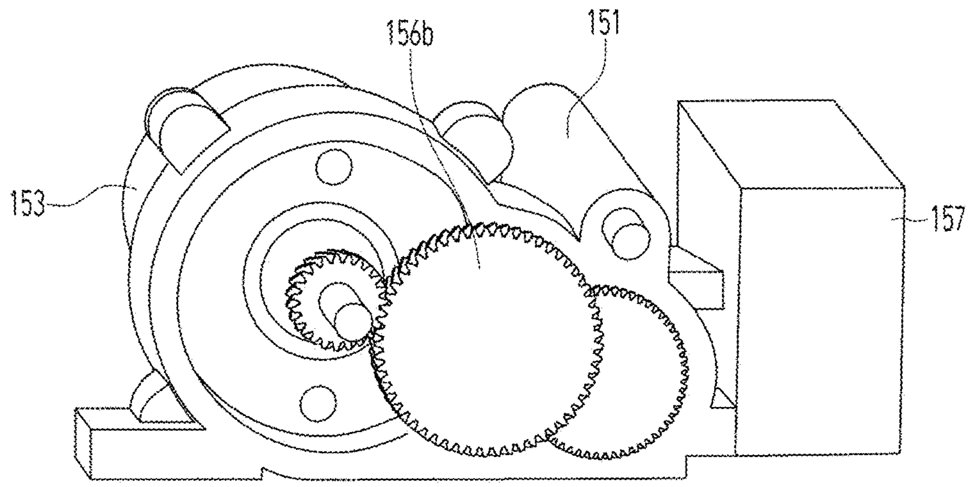
Figure 8:
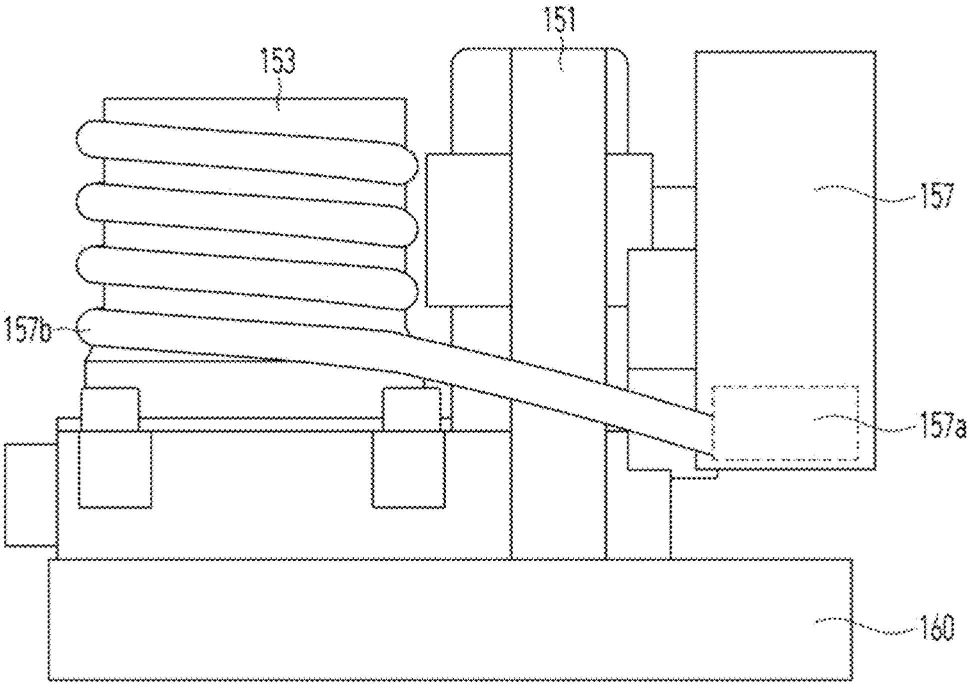
FIG. 8 is a diagram showing a coolant pipe of a brake module kit in a brake device according to one of embodiments of the present disclosure.
Figure 9:
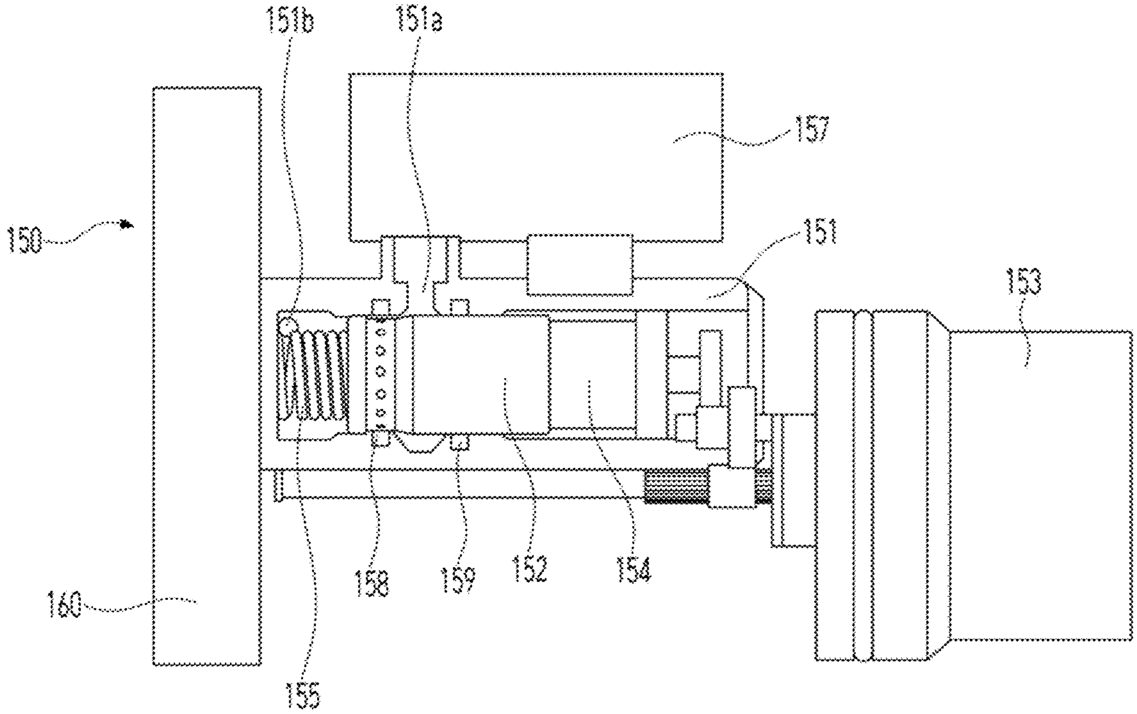
FIG. 9 is a diagram showing another embodiment of a brake module kit in a brake device in the present disclosure.

FIG. 7 is a diagram showing the reducer 156 of the brake module kit 150 in the brake device 100 according to one of embodiments of the present disclosure. FIG. 8 is a diagram showing a coolant pipe 157_b_ of the brake module kit 150 in the brake device 100 according to one of embodiments of the present disclosure. In addition, FIG. 9 is a diagram showing another embodiment of the brake module kit 150 in the brake device 100 in the present disclosure.

In the brake device 100 according to one embodiment of the present disclosure, the brake module kit 150 may include the reducer 156 located between the driving motor 153 and the bolt screw 154. In this regard, the reducer 156 may include one of a guide belt 156_a_ and a guide gear 156_b_ that connect and synchronize the driving motor 153 and the bolt screw 154 to each other, as shown in FIG. 7.

The reducer 156 may serve to amplify the power of the motor by reducing the number of rotations of the bolt screw 154 compared to the number of rotations of the driving motor 153. In other words, the reducer 156 may play a role in adjusting a gear ratio when a gear with a greater number of teeth, compared to the number of teeth of a gear coupled to the driving motor 153, is coupled to the bolt screw 154.

In addition, the driving motor 153 may be disposed at a location that does not overlap the caliper cylinder 140 and the brake pad 120 via the reducer 156, allowing more freedom in securing a size and a disposition space of the driving motor 153.

In addition, as shown in FIG. 8, in the brake device 100 according to one embodiment of the present disclosure, the reservoir 157 of the brake module kit 150 may further include a coolant chamber 157_a_ in which coolant is stored. In addition, the brake module kit 150 may further include the coolant pipe 157_b_ that is connected to the coolant chamber 157_a_ and surrounds the driving motor 153. Accordingly, heat generation in the driving motor 153 may be effectively prevented when a temperature of the driving motor 153 rises.

In addition, the brake module kit 150 in the brake device 100 according to one embodiment of the present disclosure may be commonized by being applied to various types of caliper bodies 110 as described above. In other words, arrangement of the components of the brake module kit 150 may vary depending on a shape or a size of the caliper body 110. As an example, FIG. 9 shows an embodiment in which the components of the brake module kit 150 in the present disclosure are arranged differently.

Summarizing the above, in the brake device and the vehicle equipped with the brake device according to the present disclosure, the brake module kit may be commonized by being applied to the various types of caliper bodies. In addition, even when the number of caliper pistons that pressurize the brake pad is increased, there is no need to increase the numbers of motors, gears, and bolt screws, and the operational deviation between the caliper pistons may not occur. In addition, compared to the conventional electromechanical brake, the size of the component may be reduced, enabling a lightweight and compact design, thereby securing additional space for mounting other components such as the electronic control unit.

The above detailed description is to be construed in all aspects as illustrative and not restrictive. The scope of the present disclosure should be determined by reasonable interpretation of the appended claims and all changes coming within the equivalency range of the present disclosure are intended to be embraced in the scope of the present disclosure.

What is claimed is:

1. A brake device comprising:

a caliper body;

a brake pad disposed within the caliper body;

a caliper piston configured to press the brake pad;

a caliper cylinder containing the caliper piston; and a brake module kit directly mounted on the caliper cylinder and including:

a master cylinder containing brake fluid;

a master piston disposed within the master cylinder;

a driving motor separated from the master cylinder and configured to generate a rotational force to linearly move the master piston within the master cylinder; and a reducer connected between a bottom portion of the driving motor and a bottom portion of the master cylinder and configured to transfer, to the master cylinder, the rotational force generated by the driving motor, wherein the master piston, when moved by the driving motor, pressurizes the brake fluid in the master cylinder to flow to the caliper cylinder, and a pressure in the caliper cylinder generated by the brake fluid in the caliper cylinder causes the caliper piston to press the brake pad.

2. The brake device of claim 1, wherein the brake module kit further includes:

a bolt screw configured to receive the rotational force via the reducer, convert the rotational force into a linear motion and transmit the linear motion to the master piston; and an elastic member configured to return the master piston to a location before the driving motor moves the master piston, and wherein the reducer is located between the driving motor and the bolt screw and configured to connect and synchronize the driving motor and the bolt screw.

3. The brake device of claim 1, wherein:

the master cylinder includes a side surface and a first connection portion disposed on the side surface, and the brake module kit further includes a reservoir connected to the first connection portion of the master cylinder and storing the brake fluid.

4. The brake device of claim 3, wherein:

the master cylinder further includes a second connection portion disposed on the side surface and connected to the caliper cylinder, and the brake module kit further includes a first seal cup disposed around the master piston and filling a gap between the master piston and the master cylinder.

5. The brake device of claim 4, wherein the first seal cup is configured to:

open a space between the first and second connection portions before the driving motor moves the master piston; and separate the first and second connection portions and allow the brake fluid to be pressurized when the driving motor moves the master piston.

6. The brake device of claim 5, wherein the brake module kit further includes a second seal cup spaced apart from the first seal cup, disposed around the master piston and blocking the brake fluid from leaking from the master piston.

7. The brake device of claim 1, wherein:

the caliper cylinder includes a plurality of caliper cylinders, and the caliper piston includes a plurality of caliper pistons, and the master cylinder is connected to the plurality of caliper cylinders.

8. The brake device of claim 1, wherein the brake module kit further includes an electronic control unit (ECU).

9. A brake device comprising:

a caliper body;

a brake pad disposed within the caliper body;

a caliper piston configured to press the brake pad;

a caliper cylinder containing the caliper piston; and a brake module kit connected to the caliper cylinder and including:

a master cylinder containing brake fluid;

a master piston disposed within the master cylinder; and a driving motor configured to linearly move the master piston within the master cylinder, wherein the master piston, when moved by the driving motor, pressurizes the brake fluid in the master cylinder to flow to the caliper cylinder, and a pressure in the caliper cylinder generated by the brake fluid in the caliper cylinder causes the caliper piston to press the brake pad, wherein the master cylinder includes a side surface and a first connection portion disposed on the side surface, wherein the brake module kit further includes a reservoir connected to the first connection portion of the master cylinder and storing the brake fluid, wherein the reservoir includes a coolant chamber storing coolant, and wherein the brake module kit further includes a coolant pipe connected to the coolant chamber and surrounding the driving motor.

10. A vehicle comprising:

a vehicle body;

a plurality of wheels configured to rotate, each wheel including a brake disc; and a plurality of brake devices respectively disposed on the plurality of wheels and respectively in contact with the brake discs to limit rotation of the plurality of wheels, wherein at least one of the plurality of brake devices includes:
a caliper body;
a brake pad disposed within the caliper body;
a caliper piston configured to press the brake pad;
a caliper cylinder containing the caliper piston; and
a brake module kit directly mounted on the caliper cylinder, wherein the brake module kit includes:
a master cylinder containing brake fluid;
a master piston configured to move linearly in the master cylinder;
a driving motor separated from the master cylinder and configured to generate a rotational force to linearly move the master piston within the master cylinder; and
a reducer connected between a bottom portion of the driving motor and a bottom portion of the master cylinder and configured to transfer, to the master cylinder, the rotational force generated by the driving motor,
wherein, when moved by the driving motor, the master piston pressurizes the brake fluid in the master cylinder to flow to the caliper cylinder, and a pressure generated by the brake fluid in the caliper cylinder causes the caliper piston to press the brake pad.

11. The brake device of claim 1, further comprising:
a first seal cup disposed around the master piston and filling a gap between the master piston and the master cylinder; and
a second seal cup spaced apart from the first seal cup, disposed around the master piston and blocking the brake fluid from leaking from the master piston.

12. The vehicle of claim 10, wherein the brake module kit further comprises:
a first seal cup disposed around the master piston and filling a gap between the master piston and the master cylinder; and
a second seal cup spaced apart from the first seal cup, disposed around the master piston and blocking the brake fluid from leaking from the master piston.

* * * * *